United States Patent Office 3,801,629
Patented Apr. 2, 1974

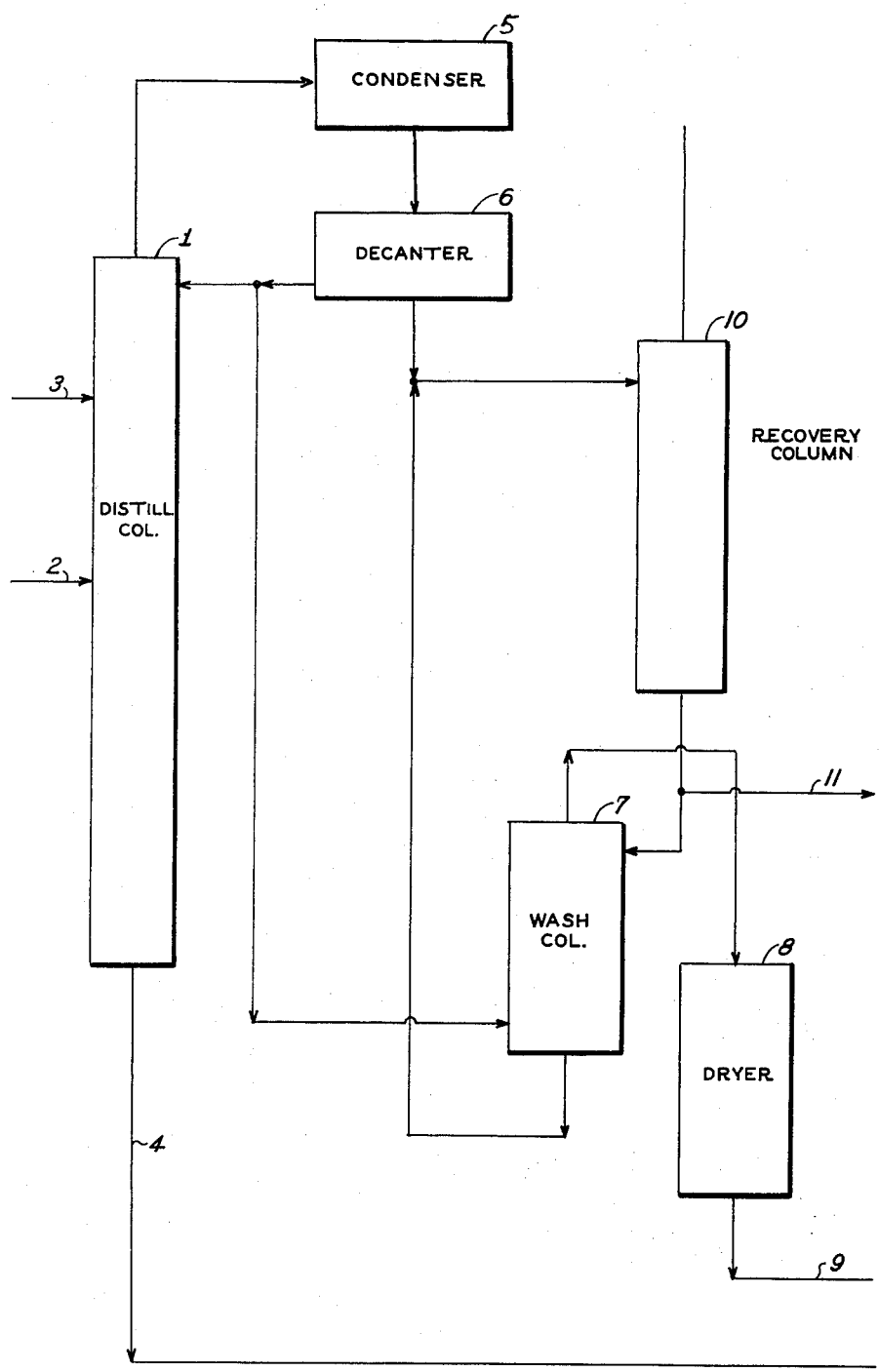

3,801,629
SEPARATION OF ACETIC ACID, WATER AND FORMIC ACID
René Léon Aga, Grimbergen, and Henri Robert Debus, Meise, Belgium, assignors to Labofina S.A., Brussels, Belgium
Filed Mar. 29, 1971, Ser. No. 129,246
Claims priority, application Great Britain, July 31, 1970, 37,199/70
Int. Cl. C07c 51/44, 67/06
U.S. Cl. 260—541                             8 Claims

ABSTRACT OF THE DISCLOSURE

A mixture of formic acid, water and acetic acid are separated by continuous distillation in a column still by adding the feed at least above the tenth theoretical plate and adding an esterifying agent for the formic acid consisting of an alcohol or an ester of the alcohol in which the alcohol has at least three carbon atoms and preferably 3 to 8 carbon atoms, and the acid of the ester being higher boiling than formic acid, the esterifying agent being added in an esterification zone disposed at least one theoretical tray above the feed level whereby concentrated acetic acid accumulates at the bottom of the column and substantially all of the formic acid and water pass overhead as the formic ester; the ester continuously formed of the formic acid serves as a water entraining agent and passes overhead of the column with the water.

---

The process may be applied in working up mixtures of oxidation products from the manufacture of acetic acid, or mixtures of products from oxidation processes using acetic acid as a solvent, or mixtures obtained in the production of acetic acid from wood distillate.

Numerous methods are known for the separation of mixtures containing acetic acid, water and formic acid. Almost all of them use in at least one stage an azeotropic distillation. In some processes the distillation is combined with extraction or chemical reaction. All the known methods use more than one operation to separate completely the three components into pure compounds. In some methods a mixture of acetic acid, water and formic acid is separated by azeotropic distillation using an entrainer such as for example ethylene dichloride, a light hydrocarbon distillate, hexane, benzene, a mixture of esters, alcohols or aldehydes. The disadvantage of this method is that the formic acid is recovered in a dilute aqueous solution which at least in some cases still contains some acetic acid. This solution has to be worked up further to obtain the formic acid in a commerciale form. Other methods avoid this drawback by separating the water from the mixture acetic acid-water-formic acid in a first azeotropic distillation; in a subsequent azeotropic distillation formic acid is separated from the anhydrous mixture acetic acid-formic acid. The entrainers used for the separation of water are for example isopropylether, ethyl-butylether. Entrainers for the separation of formic acid are for example toluene, chloro-butane. These methods have the important disadvantage that two azeotropic distillations are required and that generally important amounts of entrainer are needed for the dehydration. Still other methods use thermal-catalytic decomposition to eliminate the formic acid from the crude mixture. Suitable catalysts are for example nickel dichromate, phosphoric acid. These methods have several disadvantages as for example high heat requirements, production of less valuable products, and the water must anyway be separated by a subsequent azeotropic distillation. It is also known to separate formic acid from acetic acid containing water, by first esterifying the formic acid in the mixture of said compounds and then distilling off the formic acid ester, but in the methods used the choice of esterification reagents is limited to less interesting alcohols and esters, i.e. to these having a boiling point lower than 100° C. Moreover a catalyst is needed to obtain rapid esterification and the acetic acid recovered by this method contains still considerable amounts of formic acid which cannot be separated.

The main object of the present invention is to provide a process for the separation of a crude mixture of acetic acid, water and formic acid using a single distillation, leaving substantially pure acetic acid. Another object of the present invention is to provide a process whereby the formic acid ester forming an azeotropic mixture with water is produced in situ in the distillation column, without the use of catalyst. A further object of the invention is to provide a process whereby the choice of esterification agent for formic acid is only limited by the property that the produced formic acid ester must form with water a lower boiling azeotrope.

According to the present invention a process for dehydrating acetic acid and eliminating formic acid from a mixture of acetic acid, water and formic acid comprises introducing said mixture into a continuous distillation column above a lower zone comprising at least ten theoretical plates or trays and in which the bottom temperature is in the range of about 115–135° C. at atmospheric pressure, introducing an esterification reagent in the upper zone of said column, said upper or esterifying zone comprising at least two theoretical plates disposed above the feed level, withdrawing substantially pure acetic acid from the bottom of the column and recovering a mixture comprising mainly water and formic acid ester at the top of the column.

The composition of the mixtures to be worked up by the proces of the invention may vary within wide limits, such as 20 to 90% by weight of acetic acid, 5 to 60% by weight of water and 0.2 to 60% by weight of formic acid. The invention is particularly suited for the separation of mixtures obtained in the production of acetic acid or mixtures of products from oxidation processes using acetic acid as a solvent. Such mixtures contain 40 to 70% by weight of acetic acid, 20 to 50% by weight of water and 0.5 to 15% by weight of formic acid. Small amounts, namely up to 20% by weight, of other substances may be present in the mixture provided that they do not interfere with the formation of formic acid esters and the azeotropic dehydration of acetic acid. Such substances may be low boiling constituents which escape with the water azeotropic mixture, or high boiling constituents remaining in the acetic acid and, in such case, further purification will eventually be needed to remove these impurities, such as propionic acid, from the distillation products. Such a purification can generally be done by simple methods.

Suitable esterification reagents to produce the entrainer for the dehydration of acetic acid and the elimination of formic acid are saturated aliphatic alcohols containing from 3 to 6 carbon atoms inclusive or mixtures of alcohols containing mainly, i.e. more than 80% by weight of aliphatic alcohols containing from 3 to 6 carbon atoms, the rest consisting of alcohols containing up to 8 carbon atoms. Good results have been achieved with the use of isopropyl alcohol, n-propylalcohol, isobutylalcohol, tert.-butylalcohol, n-butylalcohol, iso-amylalcohol, n-amylalcohol and hexylalcohols. Also suitable reagents are the aliphatic carboxylic acid esters of these alcohols and mixtures of alcohols, said esters being derived from carboxylic acids having a higher boiling point than formic acid. Although a wide variety of said esters may be used, the preferred carboxylic acid esters are the acetic acid esters.

The amount of esterification agent depends on the proportion of formic acid present in the crude mixture. Good results are generally achieved with the use of the esterification agent in an amount varying from 0.5 to 2 times the stoichiometric quantity which is needed to esterify the formic acid in the crude mixture, and more particularly with an amount of 0.8 to 1.2 times said stoichiometric quantity.

So that the acetic acid may be dehydrated and substantially freed of formic acid, using a single stage, it is essential that some conditions should be fulfilled. In the lower part of the distillation column, a zone must be provided wherein the acetic acid is concentrated, without accumulation of esterifying agent. In one zone situated above this concentration zone, conditions must be realized to favor the selective formation of formic acid ester, without formation of acetic acid ester and to avoid that esterification agent goes down in the lower zone. Moreover, at the top of the distillation column, water must freely distill off under the form of a low boiling mixture with the formic acid ester.

Thus, it is an essential feature of the process that in the distillation column, two zones are provided, namely a lower zone or acetic acid rich zone and an upper zone or esterification zone, the crude mixture being generally introduced in the column between both zones. On the other hand, to promote the selective formation of formic acid ester, the esterification agent is introduced in the upper zone and preferentially in countercurrent with the formic acid in the column.

The temperature in the reboiler or lower part of the column is maintained sufficiently high so that the acetic acid is concentrated and remains practically free of formic acid, water and low boiling constituents, but not so high as to cause undesirable loss of acetic acid by distillation. Thus, temperatures in the range of about 115–135° C., at atmospheric pressure, and preferably between 118 and 122° C., are generally employed. On the other hand, it has been found that the height of said zone must correspond to at least ten theoretical plates. The crude mixture is generally introduced above the lower zone and, in order to secure a maximum of selectivity in the formation of the formic acid ester, the esterification agent hereabove defined is introduced preferentially in countercurrent with the formic acid in the column. When the formic acid content of the crude mixture is relatively high and the water content is low, the esterification agent may be introduced along with this mixture. But, in majority of cases, where the formic acid content does not generally exceed 15% by weight, the minimum distance between the level of introduction of the crude mixture and the level of supply of the esterifying agent corresponds to about one theoretical plate, the upper or esterifying zone comprising at least two theoretical plates.

In fact, the total number of theoretical plates of the column and the respective feed levels for the crude mixture and for the esterifying agent depend largely on the composition of this crude mixture. However, introduction of the crude mixture above the 10th theoretical plate, and more particularly between about the 25th and the 50th plate, and introduction of the esterification agent at a level which is situated at 1 plate, minimum, preferably 5 to 15 plates above the crude mixture feed, may be used to achieve an effective separation of water and formic acid from solutions containing from 40 to 70% by weight of acetic acid and 20 to 50% by weight of water, the rest consisting mainly in formic acid.

In a preferred embodiment of the present invention, a temperature varying from about 80 to 110° C. is kept at the esterification zone. It has been found, quite unexpectedly, that an esterification rapidly sets in, without the use of an esterifying catalyst and with the selective formation of formic acid ester.

In order to distill off the low boiling mixture of water and formic acid ester, the temperature at the top of the column is kept between about 65 and 95° C., at atmospheric pressure, this temperature depending mainly on the nature of said formic acid ester.

Although the choice of the pressure is not critical, the process of the present invention is preferably carried out at a pressure varying from 0.5 to 5 atmospheres and more specifically at about atmospheric pressure.

In order that the invention may be more fully understood it will now be further described with reference to the following examples, the apparatus used in carrying out the examples being described with reference to the accompanying drawing which shows a line diagram of the apparatus.

EXAMPLE I 1000 weight units per hour of a mixture having the following composition:

53% by weight acetic acid
43% by weight water
4% by weight formic acid were introduced through line 2 above the 30th plate of a distillation column 1 having in total 44 plates and operating at atmospheric pressure. Simultaneously 60 weight units per hour of n-butylalcohol were also, introduced through line 3 into the column at the 12th plate above the feed plate. The temperature at the feed plate was maintained between 100 and 110° C. The reboiler temperature was between 119 and 120° C. At the bottom of the column, 533.6 weight unit per hour of acetic acid were withdrawn through line 4. This acetic acid had a purity of over 99% by weight and contained less than 0.15% by weight of water, less than 0.5% by weight of formic acid and less than 0.3% by weight of butyl acetate and no butyl alcohol. The top temperature of the column was maintained between 84 and 86° C. The overhead vapors were condensed in condenser 5 and separated into two liquid layers in decanter 6, namely into a butyl formate layer or upper layer and water layer or lower layer. Part of the butyl formate and water were recycled to the column 1. Part of the butyl formate layer which contained about 2.5% by weight of n-butyl alcohol was water-washed in the wash column 7 and dried in dryer 8. In this manner, 81.6 weight units per hour of n-butyl formate having a purity of 99.7% by weight were removed through line 9. The lower layer, i.e. the water layer, of decanter 6 was introduced into the recovery column 10, where the ester and alcohol dissolved in the water were recovered and recycled to the distillation column 1. The water was thus purified in column 10 and 444.8 weight units per hour of water were recovered through line 11. This water had a total acid content of less than 0.2% by weight. Part of the water was used to wash the formic acid esters if necessary, in the wash volumn 7. The wash waters were returned to the recovery column 10.

EXAMPLE 2

The operation described in Example 1 was repeated using the same crude mixture and the same apparatus, but an alcohol fraction containing 84% by weight of n-butyl alcohol, the rest comprising alcohols with 3, 5, 6, 7 and 8 carbon atoms was used instead of practically pure n-butyl alcohol. Acetic acid was also recovered with a purity over 99% by weight.

EXAMPLE 3

The operation described in Example 1 was repeated using the same crude mixture and the same apparatus, but n-butyl alcohol was substituted by iso-amylalcohol which was introduced at a rate of 78.3 weight units per hour. The temperature on the feed plate was maintained between 100 and 110° C. while the reboiler temperature was between 119 and 120° C. At the bottom of the column 533.7 weight unit per hour of acetic acid with a purity of 99% by weight was recovered. It contained less than 0.2% by weight of water, less than 0.3% by weight of formic acid, less than 0.6% by weight of isoamylacetate and no isoamylalcohol. The top temperature of the column was maintained between 90.5 and 91.5° C. After condensation of the overhead vapors, 100.5 weight units per hour of isoamylformate having a purity of 97.3% by weight were recovered. Water was recovered at a rate of 444.1 weight units per hour.

EXAMPLE 4

The process described in Example 3 was repeated, but with the use of n-butyl acetate instead of iso-amyl alcohol. Similar results were obtained.

In this example, however, an amount of acetic acid higher than the introduced amount was recovered while in the preceding examples, more water than introduced leaves the process, this excess water being produced by the esterification reaction.

EXAMPLE 5

By using the same process as described in Example 1, 1000 weight units per hour of a mixture having the following composition:

67% by weight acetic acid
24% by weight water and
9% by weight formic acid were treated by 140 weight units per hour of n-butylalcohol. The withdrawn acetic acid had a purity of over 99% by weight and contained less than 0.15% by weight of water, less than 0.3% by weight of formic acid and less than 0.2% by weight of butyl acetate.

What is claimed is:

1. A process for dehydrating acetic acid and eliminating formic acid from a crude mixture of acetic acid, water and formic acid, said process comprising introducing said crude mixture into a feed zone of a continuous distillation column above a lower acetic acid-rich zone in said column comprising at least ten theoretical trays and in which the bottom temperature is in the range of about 115° C.–135° C. measured at atmospheric pressure, introducing an esterification reagent into an upper esterification zone in said column at a distance of at least one theoretical plate above said feed zone of said column to selectively esterify formic acid in the absence of a catalyst, said esterification agent being selected from the group consisting of alkanols having up to 8 carbon atoms or mixtures of alkanols having up to 8 carbon atoms and containing at least 80% of alkanols having 3 to 6 carbon atoms, and esters of said alkanols of a fatty acid boiling higher than formic acid, said upper esterification zone comprising at least two theoretical plates, the temperature in said esterification zone being from 80° C. to 110° C., withdrawing substantially pure acetic acid from the bottom of the column and recovering a mixture comprising a major proportion of water and formic acid ester from the top of the column, the temperature at the top of said column being 65 to 95° C. at atmospheric pressure.

2. The process of claim 1 wherein said esterification agent is introduced in countercurrent flow with the formic acid in the column and in an amount corresponding to 0.5 to 2 times the stoichiometric quantity which is needed to esterify the formic acid in the crude mixture.

3. The process of claim 1 wherein said substantially pure acetic acid withdrawn from the bottom of the column is a dehydrated acetic acid containing less than 0.5% by weight of formic acid.

4. The process of claim 1 wherein the esterification reagent is used in an amount corresponding to 0.8 to 1.2 times the stoichiometric amount required to esterify the formic acid contained in the crude mixture.

5. The process of claim 1 wherein said crude mixture comprises 40 to 70% by weight of acetic acid, 20 to 50% by weight of water and 0.5 to 15% by weight of formic acid.

6. The process of claim 5 wherein said crude mixture is introduced into a continuous distillation column above a lower zone comprising 25 to 50 theoretical plates and in which the bottom temperature is in the range of about 115–135° C. at atmospheric pressure, introducing an esterifying agent at a level which is situated from 10 to 15 theoretical plates above the crude mixture feed, the temperature in the esterification zone being between 80 to 110° C. the temperature at the top of the distillation column being between 65 and 95° C.

7. The process of claim 1 wherein the esterification agent is selected from the group consisting of n-butyl alchohol and its acetate and the temperature at the top of the column is kept between 84 and 86° C. at atmospheric pressure.

8. The process of claim 1 wherein the esterification reagent is selected from the group consisting of isoamylalcohol and its acetate and the temperature at the top of the column is kept between 90 and 92° C. at the atmospheric pressure.

References Cited

UNITED STATES PATENTS 3,660,483   5/1972   Hobbs et al. _____ 260—541

VIVIAN GARNER, Primary Examiner

U.S. Cl. X.R.

260 410.9R, 412, 488F, 499